United States Patent [19]

Espenscheid et al.

[11] 4,103,963
[45] Aug. 1, 1978

[54] CALCITE CONTROL IN AN IN SITU LEACH OPERATION

[75] Inventors: Wilton F. Espenscheid; Israel J. Heilweil, both of Princeton, N.J.; Tsoung Y. Yan, Philadelphia, Pa.

[73] Assignee: Mobil Oil Corporation, New York, N.Y.

[21] Appl. No.: 781,238

[22] Filed: Mar. 25, 1977

[51] Int. Cl.² ............................................. E21B 43/28
[52] U.S. Cl. .................................. 299/4; 166/244 C
[58] Field of Search .................................... 299/4, 5

[56] References Cited

U.S. PATENT DOCUMENTS

| 3,205,013 | 9/1965 | Miller et al. | 299/5 |
| 3,792,903 | 2/1974 | Rhoades | 299/5 |
| 3,891,397 | 6/1975 | Fiedelman | 299/5 |

Primary Examiner—Ernest R. Purser
Attorney, Agent, or Firm—C. A. Huggett; Drude Faulconer

[57] ABSTRACT

A method of controlling calcite in an in situ leaching operation by retarding the growth of calcite crystals in the lixiviant only for the resident time that the lixiviant is in a critical area of the leach circuit and then allowing the calcite to precipitate from the lixiviant in a noncritical area. A chemical inhibitor, e.g., sodium hexametaphosphate, is added to the lixiviant as the lixiviant enters a critical area, e.g., from the bottom of a production well to surface processing equipment. The inhibitor is added to the lixiviant in an amount sufficient only to retard calcite precipitation while the lixiviant moves through a critical area but not to seriously impede calcite precipitation after the lixiviant exits the critical area.

12 Claims, 1 Drawing Figure

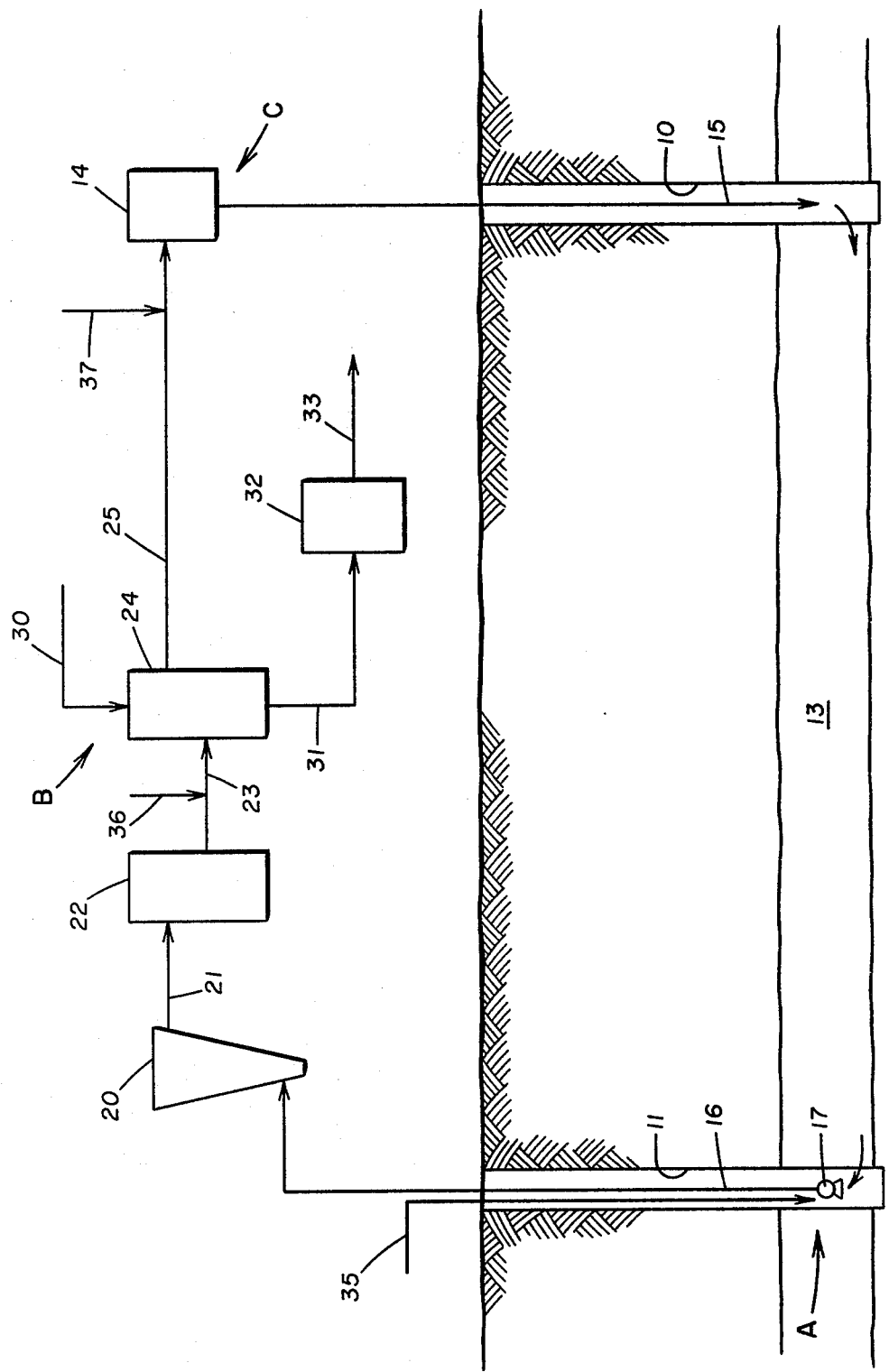

CALCITE CONTROL IN AN IN SITU LEACH OPERATION

BACKGROUND OF THE INVENTION

The present invention relates to a method of recovering uranium and related values, e.g., molybdenum, manganese, titanium, etc., from subterranean deposits and more particularly relates to a method of controlling calcite precipitation in an in situ leach operation by retarding or inhibiting the growth of calcite crystals in critical areas of the leaching circuit while allowing calcite precipitation in noncritical areas.

In a typical in situ leach operation for recovering uranium and/or related metal values, wells are completed into a mineral bearing formation and a lixiviant is flowed between the wells. The uranium and/or related values are dissolved into the lixiviant and are produced therewith to the surface where the pregnant lixiviant is treated to recover the desired values. For an example of such a leach operation, see U.S. patent application Ser. No. 712,404, filed on Aug. 6, 1976.

In many of the known uranium and other mineral bearing formations, a substantial part of the formation matrix is comprised of calcium-based clays (e.g., smectite) and/or limestones. When certain lixiviants (e.g., carbonate and/or bicarbonate solutions) are used in these types of formations, the calcium clays and/or limestones react with the lixiviants to form substantial amounts of calcite (i.e., calcium carbonate) in the lixiviants which, if not properly controlled, will precipitate within the leaching circuit, thereby creating scaling and/or plugging problems throughout the operation.

There are certain critical areas within the leaching circuit where this scaling or plugging is extremely serious and may jeopardize the entire operation. These areas are (1) within the production well as the pregnant lixiviant is produced to the surface, (2) across the extraction means, e.g., the ion exchange columns, used to extract the uranium and/or related values from the lixiviant, and (3) between the point where the fresh lixiviant is made and the point where it is injected into the formation at the bottom of the injection well. The continued build up of precipitated calcite in these areas will normally shut down the operation and expensive treatment procedures will be required before operation can be resumed.

As recognized in copending U.S. application Ser. No. 732,234, certain procedures may be followed to combat calcite build up in the leaching circuit. For example, excess carbon dioxide ($CO_2$) can be added to the lixiviant at various points in the circuit which aids in keeping the calcite in solution. However, it may be difficult to keep the $CO_2$ in solution since it easily vaporizes out of the lixiviant at the pressures existing in the leach circuit. Also, special equipment, such as calcite precipitators and/or commercially available water softeners can be used in the surface processing of the lixiviant to physically and/or chemically remove calcite. Although complete removal of the calcite from the lixiviant is most desirable, in many known leach operations the total removal of calcite from the lixiviant with such equipment would be extremely expensive and would seriously affect the over-all success of a commercial leach operation. Accordingly, there is normally some calcite still present in the lixiviant even after treatment with such equipment and this calcite can foul the extraction means used for extracting the uranium and/or related values from the lixiviant. Further, since the barren lixiviant is used to make fresh lixiviant, calcite in barren lixiviant may precipitate in the mixing tanks and/or the injection wells.

As is known, certain chemicals commonly called "inhibitors" can be added to a solution to prevent scale build up due to calcite precipitation. For example, inhibitors have been used to treat feed water for steam boilers to prevent scale in the boiler tubes. Also, inhibitors have been proposed for use in certain petroleum production operations where calcite may be a problem. However, the indiscriminate use of such inhibitors in an in situ leaching cycle where the lixiviant is to be reused would be detrimental since normal amounts of inhibitors would tend to stabilize the calcite in the lixiviant, making the removal of calcite in noncritical areas difficult and causing the calcite to build up in the recycled lixiviant to levels which would threaten the leach operation.

SUMMARY OF THE INVENTION

The present invention provides a method of controlling calcite precipitation in an in situ leaching operation by retarding the growth of calcite crystals in the lixiviant only for the resident time that the lixiviant is in a critical area of the leach circuit and then allowing the calcite to precipitate from the lixiviant in a noncritical area.

In accordance with the present invention, a chemical inhibitor of the type used to control scale in water treatment, e.g., inorganic polyphosphates, is added to the lixiviant as the lixiviant enters a critical area. Such critical areas in a typical in situ leach are (1) the production flowpath from the bottom of the production well to the processing equipment on the surface; (2) the flowpath through the extraction means which are used to extract the desired values from the lixiviant; and (3) the mixing tanks where fresh lixiviant is made up and the flowpath from the mixing tanks through the injection well to the formation.

The resident time of the lixiviant in each of the critical areas is short, on the order of minutes to a few hours, and can be measured for any particular leach circuit. The inhibitor is added to the lixiviant at the beginning of each of these critical areas in an amount, e.g., from 0.1 to 10 parts per million, sufficient only to form a metastable solution of calcite in the lixiviant which will exist only until the lixiviant has passed through a respective critical area. By forming only a metastable solution as opposed to a stable solution, substantially no calcite will precipitate in the critical area but substantial calcite precipitation can occur in a noncritical area, e.g., a calcite precipitator, holding tanks, and/or in the formation, itself.

BRIEF DESCRIPTION OF THE DRAWING

The actual operation and the apparent advantages of the invention will be better understood by referring to the drawing in which:

The FIGURE is a schematical view of an in situ leaching circuit in accordance with the present invention.

DESCRIPTION OF THE PREFERRED EMBODIMENT

Referring more particularly to the drawing, the FIGURE discloses a simplified schematic view of a typical in situ leach circuit. For the sake of brevity, the leach circuit will only be described briefly and reference is made to copending U.S. application Ser. No. 732,234 for the details and operation of such a circuit.

At least one injection well 10 and at least production well 11 are completed into a uranium and/or related values bearing formation 13. In accordance with the present invention, formation 13 is of the common type having large amounts of calcium compounds therein, e.g., calcium-based clays and/or limestones. A lixiviant, e.g., alkaline carbonate and/or bicarbonate, is prepared in a make-up area, e.g., mixing tank 14, and is injected into formation 13 through line 15 in injection well 10. As is known in the art, where uranium is present, it usually occurs in such formations in its reduced tetravalent state and must be oxidized to its hexavalent state in order to make the uranium values soluble in the lixiviant. To accomplish this, an oxidant (e.g., hydrogen peroxide, air, $O_2$, sodium chlorate) is normally injected into formation 13 along with the lixiviant.

The lixiviant and oxidant flow through formation 13 from injection well 10 to production well 11. The uranium values are oxidized to $UO_2^{++}$ which forms a chemical complex with the carbonate in the lixiviant, e.g., uranyl tricarbonate ion. This ion, in turn, dissolves into the lixiviant (which is now referred to as pregnant lixiviant). Unfortunately, calcium is also leached from the formation and this calcium reacts with carbonate in the lixiviant to form calcite (calcium carbonate) which is carried by the pregnant lixiviant to production well 11. The pregnant lixiviant (normally supersaturated with calcite, e.g., 50–200 ppm) is produced through line 16 by means of submersible pump 17 or the like to the surface for processing.

The pregnant lixiviant flows through line 16 through a calcite removal means 20, (e.g., a calcite precipitator such as a "Spiractor Precipitator" manufactured by Permutit Company, Paramus, New Jersey) to physically remove substantial amounts of calcite from the lixiviant. Desirably, all of the calcite would be removed but due to economical consideration involved in the use of such equipment, in certain known operations it is practical only to reduce the calcite content of the pregnant lixiviant to about 20–40 ppm. The pregnant lixiviant then passes via line 21 through a means 22 (e.g., packed sand column) to remove suspended solids from the pregnant lixiviant before the lixiviant passes via line 23 to uranium and/or desired values extraction means 24 (e.g., ion exchange resin column). The barren lixiviant, now stripped of the desired values, passes from means 24 through line 25 to mixing tank 14 where desired amounts of those chemicals being used to form the leaching lixiviant, e.g., ammonia, carbon dioxide, oxidant (not shown), are added to the barren lixiviant to bring it back up to strength for recycling in the leach circuit. The desired values are removed from extraction means 24 by passing an eluant from line 30, through means 24, and to recovery means 32 via line 31 where the uranium product (e.g., "yellowcake") or other values are separated from the eluant and passed to storage or the like via line 33. Again reference is made to copending U.S. application Ser. No. 732,234 for the details of such a leach circuit.

As explained above, substantial amounts of calcite are normally present in the lixiviant throughout the leach circuit. This entrained calcite, if allowed to precipitate indiscriminately within the leach circuit, will form deposits in well casings, surface tanks and lines, and/or other equipment which present serious problems in the operation. The solubility of calcite is strongly pH dependent with low pH's favoring higher solubility. The mechanism for formation of calcite deposits is roughly as follows. Dissolved carbon dioxide lowers the pH through formation of carbonic acid and this increases the solubility of the calcium salts. When the calcium-laden lixiviant is brought to atmospheric pressure, dissolved $CO_2$ escapes, increasing the pH. This decreases the solubility of calcite sharply, forming deposits in pipes and lines.

In a leach circuit such as described above, there are certain critical areas where precipitation of calcite is most likely to occur. One such critical area A is in production well 11 and line 16 through which the lixiviant is produced to the surface. As the lixiviant is produced, the pressure on the lixiviant decreases and $CO_2$ escapes, thereby creating an atmosphere for calcite precipitation. A second critical area B is across or through desired values extraction means 24 where calcite may precipitate out of the lixiviant onto the resin, thereby fouling and/or plugging the column. A third critical area C is in mixing tank 14 and line 15 in injection well 10. In mixing tank 14, the pH of the lixiviant is increased (e.g., 9.5–10.5) as the lixiviant is brought back up to strength before it is recycled in the leach circuit. This high pH environment is conducive to calcite precipitation. Precipitated calcite in critical area C not only fouls tank 14 and associated lines but most importantly may plug injection well 10, thereby rendering the entire leach circuit inoperable.

The resident times of the lixiviant in each of these critical areas are relatively short, in the order of minutes to a few hours. The leach circuit becomes operable if the calcite remains in solution until the lixiviant passes through these critical areas and then selectively deposits in noncritical areas of the circuit, e.g., calcite precipitator 20, holding tanks (not shown), and/or in the formation away from injection well 10.

In accordance with the present invention, a chemical additive commonly called an "inhibitor" is injected into the lixiviant as it enters one of the critical areas discussed above. The inhibitor is believed to adsorb on growth sites during the process of calcite crystallization and alter the growth pattern, making the crystals form more slowly and causing them to be highly distorted. Retardation of the crystal growth rate lowers the amount of solid precipitate deposited on a surface, and the distortion of the crystal structure may alter the adherence characteristics of the calcite to a surface. As shown in the FIGURE, inhibitor is injected into the lixiviant in (1) critical area A through line 35 which extends to a point near the lower end of production well 11; (2) critical area B through line 36; and (3) critical area C through line 37.

In a particular leach operation, the resident time of the lixiviant in each of the critical areas can easily be measured to determine the time that the growth of calcite crystals will need to be retarded so that the lixiviant can safely pass through a respective critical area without any substantial calcite precipitation. That is, the time that the lixiviant takes to move from the bottom of well 11 to calcite precipitator 20 is the resident time for critical area A; the time involved for lixiviant to pass through desired values extraction means 24 is the resident time for critical area B; and the time that it takes lixiviant to pass through mixing tank 14, line 15, and a short distance into formation 13 away from injection well 10 is the resident time of critical area C.

Once these resident times are determined for a particular leach circuit, experiments can establish the amount of a particular inhibitor that will have to be added to the lixiviant at one of the injection points to provide a metastable lixiviant-calcite solution which will permit the lixiviant to pass through a respective area without any substantial calcite precipitation. However, it is important that the amount of inhibitor be limited so as not to make the lixiviant-calcite solution stable to a point where there will be little or no precipitation of calcite when the lixiviant reaches a noncritical area. For example, inhibitor is continuously added through line 35 to maintain an inhibitor concentration in the produced pregnant lixiviant at a desired level to effectively retard the precipitation of calcite until the lixiviant reaches precipitator 20. At this point, the pH of the lixiviant may be raised by adding chemicals, e.g., ammonia, and the metastable lixiviant is flowed through precipitator 20 where substantial amounts of the calcite are removed from the circuit. It can be seen that it is desirable that the inhibitor in the lixiviant only functions to retard calcite crystal grown while the lixiviant moves through critical area A but does not substantially affect the precipitation of calcite as the lixiviant passes through precipitator 20.

Likewise, the amount of inhibitor injected through line 36 should be just enough to insure that the lixiviant passes through desired values extraction means 24 without substantial precipitation since excess amounts of inhibitor in critical area B might, themselves, contaminate the ion exchange resins used in extraction means 24.

Still further, the amount of inhibitor added through line 37 is such that the lixiviant may move through mixing tank 14 (where calcite precipitation is likely due to an increase of pH to a range of 9.5–10.5), down line 15, and into formation 13 without substantial calcite precipitation. However, it is important that the lixiviant-calcite solution be metastable as opposed to stable as that selective precipitation of calcite may occur in the formation (a noncritical area) after the lixiviant has moved away a short distance from the face of well 10. This prevents calcite from building up in the lixiviant to a point where the lixiviant would become unfit for future use.

The inhibitors used in the present invention may be any chemical inhibitor which, when used in the proper amount, will merely retard the growth of calcite crystals during a desired resident time interval but one which will not seriously impede calcite precipitation after the resident time has elapsed. The amount of a particular inhibitor that is to be added will depend on a variety of factors, i.e., the inhibitor, itself; whether the lixiviant is static during part of the resident time (mixing tank 14) or is constantly moving; the resident time; etc.

Examples of inhibitors which are known to be effective in the present invention are inorganic polyphosphates, e.g., sodium hexametaphosphate and sodium pyrophosphate, and organic phosphorus derivatives, e.g., 1-hydroxyethylidene-1, 1-diphosphonic acid (HEDP, commercially available under trade name "Dequest 2010," a product of Monsanto Chemical Co., St. Louis, Mo). Other considerations may enter into the selection of an inhibitor for a particular process. Such considerations include (1) whether or not the inhibitor, itself, will form insoluble calcium salts when added to the lixiviant, (2) the effect that the inhibitor might have on the ion exchange resins used to extract the desired values from the lixiviant, and (3) the stability of the inhibitor.

Of the above-mentioned inhibitors, tests have indicated that sodium hexametaphosphate is preferred in many known leach operations in that, in the amounts needed, it has least tendency to form insoluble calcium salts in the leach circuit and any calcium salts formed may be easily removed by known acidizing techniques. Also, it provides little or no contamination to the ion exchange resins normally used in the circuit and it is chemically stable to oxidation. Further, only a small amount, e.g., from 2 to 5 parts per million, is usually adequate for most leach operations.

In order to improve the effectiveness of the inhibitor, it is preferred that it be diluted with water as far as possible, e.g., 1% by weight or less, before the inhibitor is mixed into the lixiviant.

To illustrate the manner in which an inhibitor and the amount of the inhibitor may be selected, the following example and data are set forth.

Two solutions were prepared. Solution A which is representative of the materials present in a known calcium-based, uranium bearing formation contained $CaCl_2$, plus sodium and magnesium sulfates, sodium chlorate, and sodium chloride. Solution B which is representative of a lixiviant used for leaching such a formation was a mixture of sodium carbonate and bicarbonates, such that the final pH is 8.5 and potential $CO_3^{--}$ is 3000 ppm. The ionic levels of a 50/50 volume/volume mix of A and B are shown in Table I. A haze was formed in solution a few minutes after mixing. This is taken as the "cloudpoint." Some time later, a precipitate began to appear on the bottom of the flask. This was recorded as precipitation time. Finally, the deposits were characterized after elapse of 16–18 hours. These results are summarized in Table II.

As Table II shows, phosphates or phosphonates are effective in reducing nucleation time as measured by the "cloud" (haze) point, and in controlling the over-all amounts of deposits formed. About 1 ppm appears to be the minimum effective concentration for these inhibitors.

Table I

| Composition of 50/50 Mixture of Solutions A & B | |
|---|---|
| Ion | Concentration, ppm |
| $Ca^{+2}$ | 200 |
| $CO_3^{-2}$ | 3040 |
| $Na^+$ | 1725 |
| $Cl^-$ | 1085 |
| $Mg^{+2}$ | 1080 |
| $SO_4^{-2}$ | 500 |
| $ClO_3$ | 200 | pH = 8.5

Table II

| Effects of Inhibitors on Calcite Formation | | | |
|---|---|---|---|
| Inhibitor | Conc., ppm | Cloud Pt. | Precipitate Pt. | Observation, 18 hr. |
| None | — | 2 min. | 14 min. | Heavy Deposits |
| Sodium hexametaphosphate $(Na_3PO_4)$ | 5 | 25 min. | 60 min. | Very Slight Trace |
| | 1 | 8 min. | 20 min. | Heavy Deposits |
| Sodium pyrophosphate $(Na_4P_2O_7)$ | 1 | 45 min. | None[1] | Very Slight Trace |
| | 10 | >3 days | None[1] | None |
| 1-hydroxyethylidene-1, 1-diphosphonic acid | 1 | 40 min. | 3 hr. | Very Slight Trace |
| | ½ | 4 min. | 10 min.[2] | Heavy Deposits |

Table II-continued

Effects of Inhibitors on Calcite Formation

| Inhibitor | Conc., ppm | Cloud Pt. | Precipitate Pt. | Observation, 18 hr. |
|---|---|---|---|---|
| (HEDP) | | | | |

[1] Indicates that too much inhibitor was added.
[2] Inconsistent data indicates amount of inhibitor added was too small to be effective.

What is claimed is:

1. In an in situ leaching circuit wherein a lixiviant is flowed through a calcium-based, uranium and/or other metal values bearing formation from an injection well to a production well to dissolve the uranium and/or metal values and to carry said values to processing equipment on the surface, the method of controlling calcite precipitation in said circuit comprising:
   determining the resident time that said lixiviant remains in a critical area of said circuit; and
   adding a chemical inhibitor to said lixiviant as said lixiviant enters said critical area to retard the growth of calcite crystals, said chemical inhibitor being added in an amount that will prevent substantial calcite precipitation during said resident time but will not substantially interfere with calcite precipitation after said resident time has expired.

2. The method of claim 1 wherein said chemical inhibitor comprises:
   an inorganic polyphosphate.

3. The method of claim 2 wherein said chemical inhibitor comprises:
   sodium hexametaphosphate.

4. The method of claim 3 wherein said chemical inhibitor is added in the amount of from 2 to 5 parts per million.

5. The method of claim 3 wherein said chemical inhibitor comprises:
   sodium pyrophosphate.

6. The method of claim 3 wherein said inhibitor is diluted with water to form a 1% or less by weight solution before said inhibitor is added to said lixiviant.

7. The method of claim 1 wherein said chemical inhibitor comprises:
   an organic phosphorus derivative.

8. The method of claim 7 wherein said chemical inhibitor comprises:
   1-hydroxyethylidene-1, 1-diphosphonic acid.

9. The method of claim 7 wherein said inhibitor is diluted with water to form a 1% or less by weight solution before said inhibitor is added to said lixiviant.

10. The method of claim 1 wherein said processing equipment includes a calcite precipitator near said production well and wherein said critical area comprises the production line from the bottom of said production well to said calcite precipitator.

11. The method of claim 1 wherein said processing equipment includes an extraction means for extracting said uranium values from said lixiviant and said critical area comprises said flowpath through said extraction means.

12. The method of claim 1 wherein said processing equipment includes a mixing tank near said injection well for making up said lixiviant and said critical area comprises said mixing tank and the flowpath from said mixing tank into said formation at the bottom of said injection well.

* * * * *

UNITED STATES PATENT AND TRADEMARK OFFICE
CERTIFICATE OF CORRECTION

PATENT NO. : 4,103,963

DATED : August 1, 1978

INVENTOR(S) : Wilton F. Espenscheid; Israel J. Heilweil; Tsoung Y. Yan

It is certified that error appears in the above-identified patent and that said Letters Patent are hereby corrected as shown below:

Column 6, line 29, the formula "$CO_3$" should read --$CO_3^=$--;

Column 6, line 46, in Table I, line 54, "$ClO_3$" should read --$ClO_3^-$--;

Column 8, Claim 5, line 1, "3" should be --2--;

Column 8, Claim 6, line 1, "3" should be --2--.

Signed and Sealed this

Sixth Day of March 1979

[SEAL]

Attest:

RUTH C. MASON
*Attesting Officer*

DONALD W. BANNER
*Commissioner of Patents and Trademarks*